Aug. 8, 1939.  E. W. SAWYER ET AL  2,169,129
MANUFACTURE OF FORMED WIRE
Filed Jan. 20, 1938  3 Sheets-Sheet 1

INVENTORS
Edson W. Sawyer
BY Ralph F. Gibbs
Nathaniel Frucht
ATTORNEY

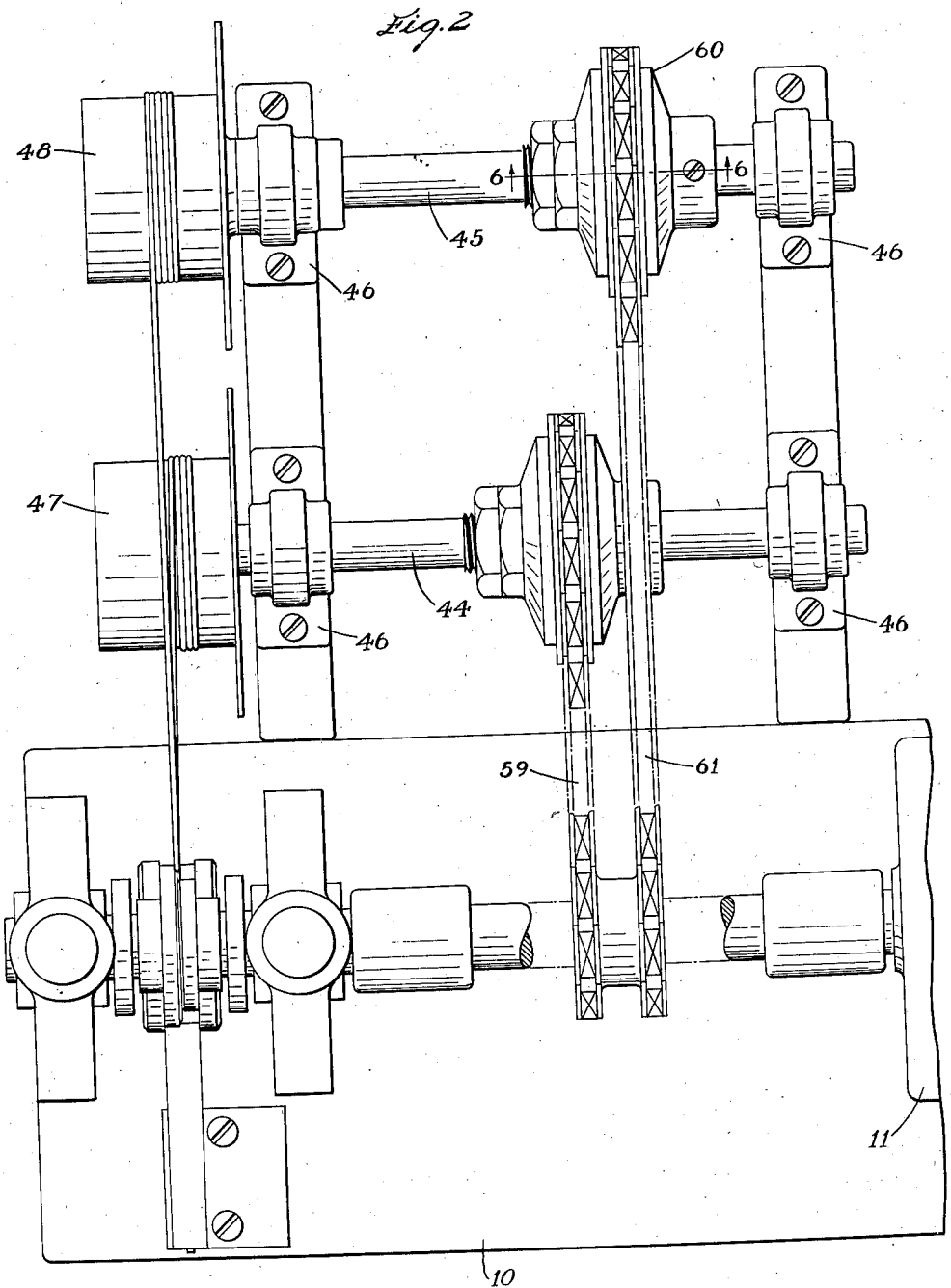

Aug. 8, 1939.    E. W. SAWYER ET AL    2,169,129
MANUFACTURE OF FORMED WIRE
Filed Jan. 20, 1938    3 Sheets-Sheet 3
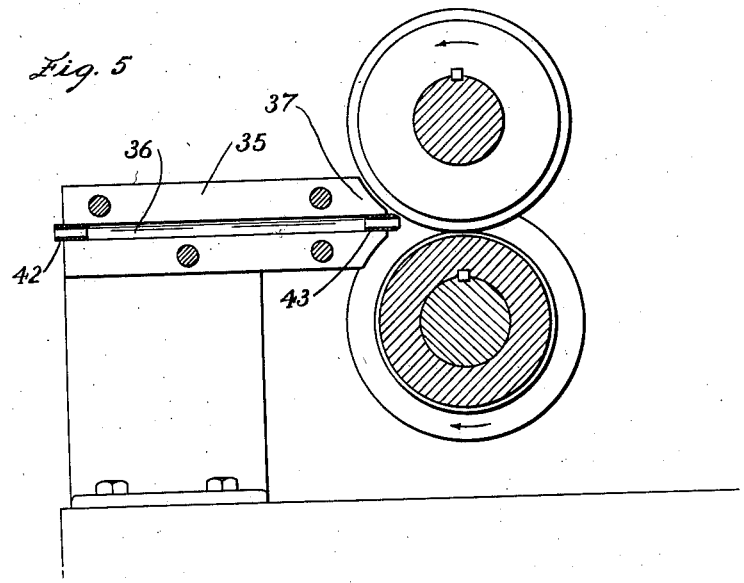
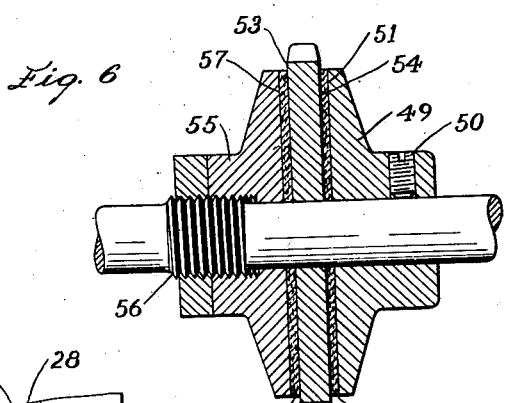
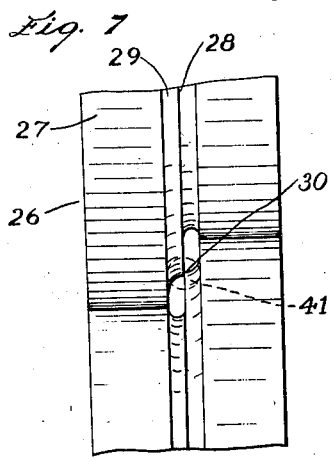
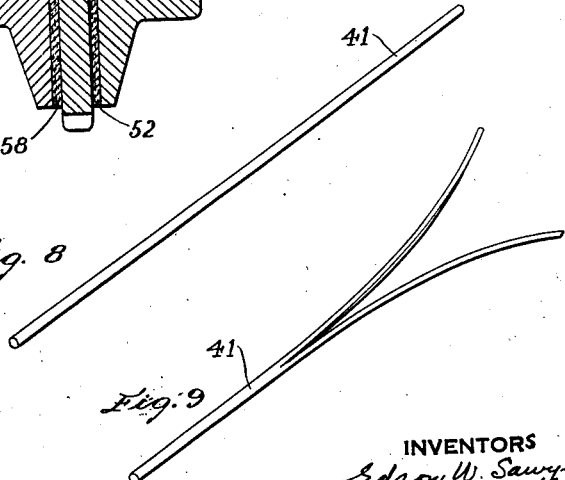
INVENTORS
Edson W. Sawyer
BY Ralph F. Gibbs
Nathaniel Frucht
ATTORNEY Patented Aug. 8, 1939

2,169,129

UNITED STATES PATENT OFFICE 2,169,129

MANUFACTURE OF FORMED WIRE

Edson W. Sawyer, Edgewood, R. I., and Ralph F. Gibbs, Norton, Mass., assignors to Laminated Metals Corporation, a corporation of Rhode Island Application January 20, 1938, Serial No. 185,988

8 Claims. (Cl. 29—20)

Our present invention relates to wire splitting devices, and has particular reference to a novel method and apparatus for splitting a seamless wire, and the novel product resulting therefrom.

The optical art utilizes half-round or non-circular wire for spectacle frames, which wire is preferably heavily gold plated. It is preferred, for manufacturing purposes and to reduce expense, to form non-circular wire which is plated with precious metal on selected sides thereof, at least one side not being plated.

It is the principal object of our invention to provide a novel method and a novel apparatus for producing non-circular plated wire having at least one side thereof not plated.

It is a further object of our invention to obtain a novel wire product comprising a base material which is plated on selected sides thereof, at a low manufacturing cost.

With the above and other objects and advantageous features in view, the invention consists of a novel method, a novel arrangement of parts, and a novel product more fully disclosed in the detailed description following, in conjunction with the accompanying drawings, and more specifically defined in the claims appended thereto.

In the drawings:

Fig. 2 is a top plan view of the same;

Fig. 5 is a vertical section taken along line 5—5 of Fig. 1;

Fig. 6 is a sectional view of the clutch drive of the winding mechanism;

Fig. 7 is an enlarged detail of the cutting blades in operative position;

Fig. 8 is a perspective view of a wire of circular cross section; and

Fig. 9 is a similar view of the same wire after being split by the machine.

Figure 1:
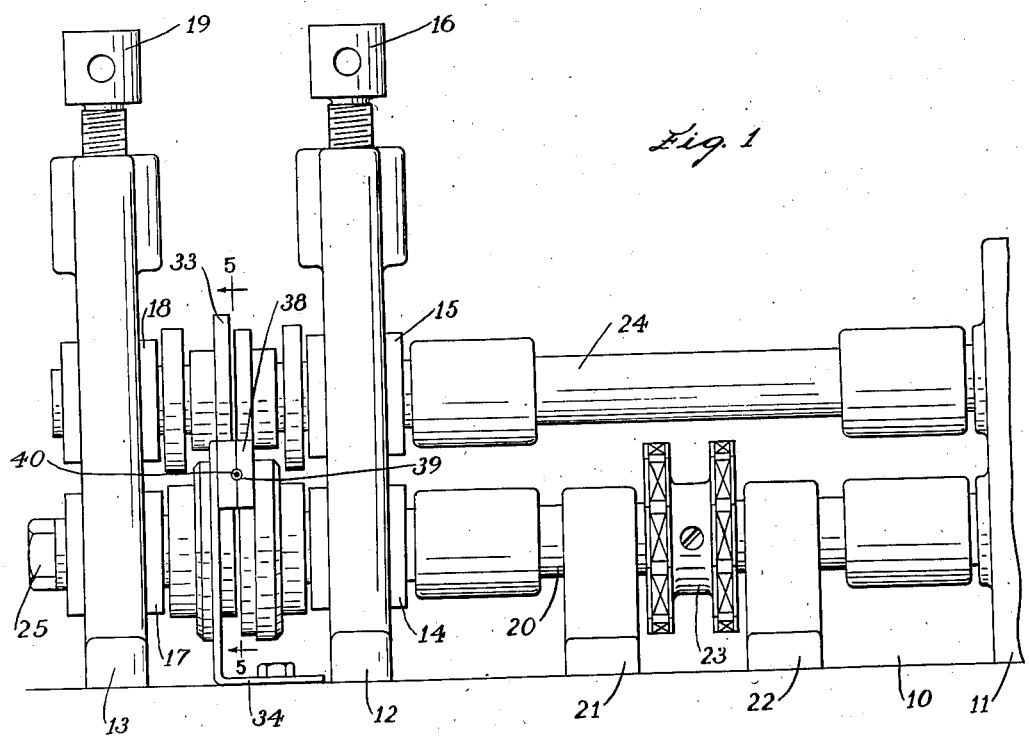
Fig. 1 is a side elevation of a machine embodying the present invention.
Figure 3:
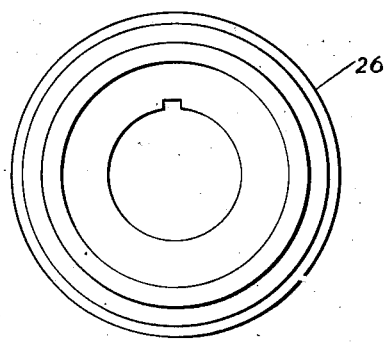
Fig. 3 is a front elevation of one of the cutting blades.
Figure 4:
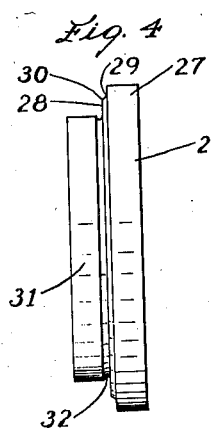
Fig. 4 is a side elevation of the same.

It has been found desirable to obtain plated wire, particularly for use in manufacturing optical goods, which is non-circular in cross section, and which has no plate on at least one side. We have found it commercially practicable to obtain the desired product by splitting plated wire of any preformed cross section, and have devised a novel method and a novel apparatus for this purpose.

Referring in detail to the drawings embodying the present invention, numeral 10 generally designates a table or other suitable base for mounting the novel machine, a suitable power driving means 11 such as an electric motor or the like being mounted on one end thereof. Spaced from the driving means 11 and aligned therewith are two suitable bearing frames 12 and 13 each having a rectangular vertically disposed opening; the opening in frame 12 has mounted therein a lower shaft bearing block 14 and an upper shaft bearing block 15 which is adjustable in height by an adjustment screw 16 which extends downwardly through the upper end of the frame 12, and the opening in frame 13 has a lower shaft bearing block 17 and an upper shaft block 18 with an adjustment screw 19. A shaft 20 is rotatably mounted in the lower shaft bearing blocks 14 and 17 and extends into and is driven by the power means 11, the portion of the shaft 20 which extends between the power means 11 and the nearest frame 12 being additionally supported by spaced collars 21 and 22 mounted on the base 10. A double sprocket wheel 23 is mounted on the shaft 20 in the spacing between the collars 21 and 22, and the lower shaft 20 may be provided with a hexagonal end 25 extending through the shaft bearing block 17 to permit the turning of the shaft by hand for inspection or other purposes. A second shaft 24 is mounted in the upper shaft bearing blocks 15 and 18 and is parallel with and directly above the lower shaft 20, one end of the shaft 24 being journalled in and driven by the same power means 11 as the lower shaft.

A cutting disc or knife 26 in the form of a plate is fixed to the shaft 20 between frames 12 and 13, and comprises a relatively thick disc portion 27 which carries a cutting face 28 of smaller diameter than the plate portion 27 mounted concentrically on its side; the edge of the cutting plate 28 being grooved as at 29 to form a sharp cutting edge 30. Concentric with the cutting plate 28 but of smaller diameter is another rolling plate 31 of substantially thick cross section separated from the cutting plate 28 by a clearance groove portion 32. Fixed to the upper shaft 24 is another cutting disc 33 identical in size and shape with the lower plate 27 but disposed reversely thereto so that the cutting edges will slightly overlap and thus ensure a complete severance of the wire, the plate portions 31 and 27 being contiguous to similar portions on the opposite disc, to thus ensure coordinated rotative cutting engagement of the blades, see Fig. 7. The shafts 20 and 24 are adapted to rotate in opposite directions, the lower shaft turning clockwise and the upper shaft counter-clockwise, note Fig. 5.

Mounted on the base 10 between the frames 12 and 13 and to one side of the shafts 20 and 24 is an angle iron support 34 carrying a wire guide block 35, the block 35 having a horizontal groove 36 and an apex 37 which extends towards the cutting edges of the discs 26 and 33. A second block 38 having a cooperating groove 39 is bolted to the block 34 to form a horizontal feed passage 40 extending through the two blocks and directed towards the contacting engagement of the cutting edges of the cutting plates. The opening 40 is of sufficient diameter to loosely hold a wire 41 which is to be cut and split in half. A pair of guide bushings 42 and 43 are clamped between the two halves of the block, one at each end of the opening 40, to more accurately guide the wire as it passes through the feed passage to the cutting edges.

The operation of the novel wire splitting mechanism may now be explained. The upper and lower shafts 20 and 24 being driven by the power means 11, the cutting plates 26 and 33 revolve so that their cutting edges 30 engage each other and slightly overlap. The wire 41 being fed to the machine from a suitable mandrel or spool, passes through the feed passage 40 in the guide block and is fed through the guide bushing 43 between the beveled arcuate portions 29 of the cutting plates. As shown in Fig. 7, the beveled edge of the upper cutting plate will tend to force the wire downwardly and outwardly while the corresponding beveled edge of the lower cutting plate, facing in the opposite direction, will tend to push the wire upwardly and inwardly towards the other plate, thus gripping the wire and drawing it between the cutting edges to center the wire; the cutting action is thus even throughout the length of the wire.

In view of the centering function of the arcuate beveled edges 29 of the cutting plates, it is obvious that when it becomes necessary to split a wire having other than a circular cross-section, such as a rectangular wire, it is necessary to alter the shape of the portions 29 to positively grip the wire. It is also desirable to change the diameter of the cutting plates to fit different thicknesses of wire. The frames 12 and 13 are therefore adjusted by means of adjustment screws 16 and 19 to widen the spacing between the shafts and thus permit mounting of cutting plates of larger diameter. To maintain the shafts in their altered position in parallel relation, the journalling of the upper shaft in the power means 11 is also raised or lowered in any conventional manner.

As the wire leaves the cutting blades in its split form, as shown in Fig. 9, the ends separate in the plane of the cut and have a tendency to distort and twist. To prevent this we provide a suitable winding mechanism, adapted to be synchronized with the cutting blades and their driving shafts, which has spaced shafts 44 and 45 disposed at one side of and parallel to the main driving shafts of the cutting blades. The shafts 44 and 45 are mounted on the base 10 in any suitable manner such as collar bearings 46, and a pair of spools or winding reels 47 and 48 are mounted on the ends of shafts 44 and 45 in line with the plane of the cutting plates. The shaft 45 and its spool 48, being farthest from the cutting mechanism, are mounted slightly higher than the shaft 44 to permit clearance of the driving mechanism, and other wire being wound thereon. Mounted on the shaft 44 is a collar 49 having a set screw 50 permitting it to be locked to the shaft, the collar 49 having a flat clutch facing 51 to which is attached a brake lining 52. Loosely mounted on the shaft 44 is a sprocket wheel 53 having a flat face 54 bearing against the brake lining 52, an adjustment collar 55 being threadedly engaged to the shaft 44 by means of adjustment threads 56, and having a clutch facing 57 and a brake lining 58 similar to the facing and lining of the collar 49. The sprocket wheel 53 is connected to the double sprocket 23 on a shaft 20 by means of a sprocket chain 59. A driving mechanism 60 similar to the one mounted on the shaft 44 is mounted on the shaft 45, and is offset from the mechanism on the shaft 44 to permit clearance, sprocket chain 61 driving the mechanism 60 from the other sprocket wheel of the double sprocket wheel 23.

As the split wire leaves the cutting blades half is wound around the spool 47 and the other half around the spool 48, these spools rotating at substantially the same speed as the cutting blades since their shafts are driven directly from the lower shaft 20. The collars 55 are adjusted so that the brake linings 52 and 58 will exert slightly more than sufficient pressure on the sprocket wheels 53 to permit drive of the shafts 44 and 45. Since the diameter of the wire wound about the spools 47 and 48 increases, there is a tendency to exert a pull on the wire as it leaves the cutting blades; if there is no compensation therefor, the spools will eventually break the wire. The friction drive, however, permits slip of sprocket wheels 53 between the brake linings 52 and 58 and keeps the wire taut, and prevents distortion without breaking the wire. The slippage on the sprocket wheels 53 is adjusted for different types of wire to compensate for different diameters and different tensile strengths.

The above described mechanism thus produces a positive splitting of a formed wire; if the formed wire is initially plated, the resulting split portions are plated on all sides except the cut sides, whereby a novel wire product having plating on all but one side is obtained. If the split wire is split again, a wire product is obtained having additional sides which are not plated. Although the wire is disclosed as split in halves, any desired relative proportions may be obtained by suitable shaping of the cutters.

The splitting method disclosed thus accomplishes the desired result in a simple, inexpensive manner, and the final product is not distorted, as the clearance spaces in the cutting discs are preferably designed to keep the cut wire width to the exact desired dimension, whereby the operation is a combined splitting and forming operation. The shape or curvature of the cutters adjacent the cutting edges is preferably the shape or curvature of the wire, so as to properly support and position the wire during the splitting operation.

The split wires can be shaped, as by rolling to change the cross-section as desired, and in some instances, to roll the plated sides slightly under and thus provide plated edges for the non-plated side. The term "plate" is broadly used in the sense of any coating of one metal with another as by rolling, plating, and the like.

While a specific constructional embodiment of the invention has been described, it is obvious that the invention may be applied to any shape of wire, and any type of finished wire product, without departing from the spirit and the scope of the invention as defined in the appended claims.

We claim:

1. The method of forming a plated wire having at least one side not plated, comprising the steps of plating a wire of extended length and narrow cross-section, and feeding said plated wire longitudinally to rotary cutters to form two sections.

2. The method of splitting a wire longitudinally, comprising the steps of feeding the wire to rotary splitting cutters, and yieldingly drawing the split portions from said cutters while preventing lateral distortion of the split portions.

3. In a wire splitting machine, two cutters mounted for juxtaposed spaced rotation, each cutter including a disk having an integral cutting face, the edge of the cutting face being arcuately bevelled.

4. In combination, a wire splitting machine comprising rotatable cutters, a feed arrangement for feeding wire axially thereto, a spool arrangement for drawing and winding split wire from said machine, and means for driving said spool arrangement and said machine cutters in unison, said driving means for said spool arrangement permitting change of speed to compensate for increasing diameter of the wound wire.

5. In combination, a wire splitting machine comprising rotatable cutters, a feed arrangement for feeding wire axially thereto, a spool arrangement for drawing and winding split wire from said machine, and means for driving said spool arrangement and said machine cutters in unison, said driving means for said spool arrangement permitting slippage to compensate for increasing diameter of the wound wire.

6. In a wire splitting machine, two cutters mounted for juxtaposed spaced rotation, each cutter including a disk having an integral cutting face, the edge of the cutting face being grooved, said cutters having interengaging means to maintain said cutting faces with the cutting edges in overlapping contacting position.

7. A cutter disk for a wire splitting machine comprising a circular plate portion, a cutting face of smaller diameter concentric therewith, and a rolling plate portion of smaller diameter, spaced from said cutting face by a clearance groove.

8. A cutter disk for a wire splitting machine comprising a circular plate portion, a cutting face of smaller diameter concentric therewith, said cutting face being arcuately grooved, and a rolling plate portion of smaller diameter, spaced from said cutting face by a clearance groove.

EDSON W. SAWYER.
RALPH F. GIBBS.